E. G. BELKNAP.
FASTENING FOR GARMENTS.
No. 9,011. Patented June 15, 1852.
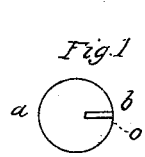
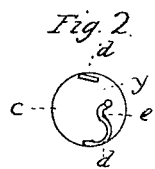
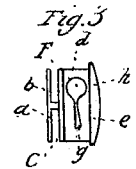
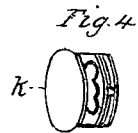
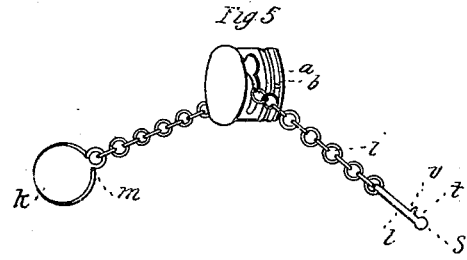

UNITED STATES PATENT OFFICE.

ELBRIDGE G. BELKNAP, OF SPRING GARDEN, PENNSYLVANIA.

IMPROVEMENT IN FASTENINGS FOR GARMENTS.

Specification forming part of Letters Patent No. 9,011, dated June 15, 1852.

*To all whom it may concern:*

Be it known that I, ELBRIDGE G. BELKNAP, of the district of Spring Garden, in the county of Philadelphia, in the State of Pennsylvania, have invented new and useful Improvements on Chains and Bar Catches; and I do hereby declare that the following is a full, clear, and exact description of the construction and operation of the same, reference being had to the annexed drawings, making a part of this specification, in which—

Figures 1 and 2 are sections. Fig. 3 is an end view, and Figs. 4 and 5 are perspective views.

To enable others skilled in the art to make and use my invention, I will proceed to show and describe its construction and operation.

Upon a plate of metal I solder a bar, the said bar stretching from the center of the plate to its circumference and having a perforation made through its outer extremity. (See Figs. 1 and 3, in which $a$ is the plate, $b$ the bar, and $o$ the perforation.) Upon the bar thus placed I solder a plate of metal similar to that shown at $a$, Fig. 1, having upon it another plate, in which is made an eyelet and catch, the said catch-plate being bent so as to form a guard, which offers no impediment to the passage of the chain or bar into the catch, but prevents its accidental escape therefrom, and it is also curved at the ends, so as to form a firm support and connection between the plate on which it stands and another essentially similar to that shown at $a$, Fig. 1, which is fixed above it, and which forms a neat and substantial cap or cover to it. (See Fig. 2, in which $c$ is the plate of metal, having upon it the catch-plate, the form of which is shown by $d\ d$, the space $y$ representing the eyelet and the shoulder $e$ the guard, and also Fig. 3, in which $c$ is the plate shown by Fig. 2; $d$ is the catch-plate; F, the eyelet; $g$, the catch; $e$, the guard, and $h$ the cap.)

The chain is made of round links soldered two together in the usual manner, having at the end a stud for the purpose of fixing it to the substance on which it is to be placed. The bar has a ball upon the end and at the proper distance from it a projection, (see Fig. 5,) in which $i$ shows the chain, $k$ the stud, and L the bar.

To use the above-described instrument, make an incision in the substance on which it is to be adjusted and insert the stud-button $m$, Fig. 5, into it. Into another incision insert the plate $a$, Figs. 1, 3, and 5, observing that the outer end of the perforated bar $b$, same figures, points from the stud. The plate $a$ serves as a button to hold the instrument upon the substance and the perforated bar keeps it from turning round, (unless the edges of the incision between which it is placed are very yielding,) in which case it (the instrument) may be sewed to the substance by means of the perforation. Now draw the chain through the eyelet until that portion of the substance on which the stud is fixed and that on which the instrument is fixed are in the required positions, and then draw it into the catch, as shown in Fig. 5. When in this position the chain cannot pass forward or backward, as the links on either side of the one in the catch cannot pass through it, and the guard formed as shown will not permit the link in the catch to escape. In order to release the chain, draw it as far forward as possible and then past the guard.

I deem it unnecessary to say anything concerning the use of the bar shown at L, Fig. 5, other than that the ball S, the projection U, and the space T are equivalent to three links of the chain, to which it is attached.

I claim—

1. The combination of the catch-plate with the plates above and below it, as shown and described.

2. The perforated bar for preventing the instrument from turning, the whole being arranged and acting substantially as set forth.

ELBRIDGE G. BELKNAP.

Witnesses:
 ROBT. BUCKMAN,
 E. ELLICOTT.